(12) United States Patent
Belov

(10) Patent No.: US 7,603,713 B1
(45) Date of Patent: Oct. 13, 2009

(54) METHOD FOR ACCELERATING HARDWARE EMULATOR USED FOR MALWARE DETECTION AND ANALYSIS

(75) Inventor: Sergeh Y. Belov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 12/413,907

(22) Filed: Mar. 30, 2009

(51) Int. Cl.
*G06F 11/00* (2006.01)
*G06F 12/14* (2006.01)
*G06F 12/16* (2006.01)
*G08B 23/00* (2006.01)

(52) U.S. Cl. ............... 726/24; 726/25; 703/23; 703/13

(58) Field of Classification Search ......... 726/22, 726/23, 24, 25; 703/13, 17, 21, 22, 23, 28
See application file for complete search history.

(56) References Cited

U.S. PATENT DOCUMENTS

| | | | | |
|---|---|---|---|---|
| 5,398,196 | A * | 3/1995 | Chambers | 714/28 |
| 5,751,982 | A * | 5/1998 | Morley | 712/209 |
| 5,978,917 | A * | 11/1999 | Chi | 726/22 |
| 6,021,510 | A * | 2/2000 | Nachenberg | 714/38 |
| 6,026,230 | A * | 2/2000 | Lin et al. | 703/13 |
| 6,094,731 | A * | 7/2000 | Waldin et al. | 714/38 |
| 6,357,008 | B1 * | 3/2002 | Nachenberg | 726/24 |
| 7,010,698 | B2 * | 3/2006 | Sheymov | 713/194 |
| 7,234,167 | B2 * | 6/2007 | Teblyashkin et al. | 726/24 |
| 7,370,361 | B2 * | 5/2008 | de los Santos et al. | 726/24 |
| 7,469,419 | B2 * | 12/2008 | Sobel | 726/24 |
| 7,475,288 | B2 * | 1/2009 | Multhaup et al. | 714/28 |
| 2002/0116635 | A1 * | 8/2002 | Sheymov | 713/200 |
| 2003/0115479 | A1 * | 6/2003 | Edwards et al. | 713/200 |
| 2005/0071824 | A1 * | 3/2005 | K. N. et al. | 717/138 |
| 2005/0177736 | A1 * | 8/2005 | de los Santos et al. | 713/188 |
| 2006/0143522 | A1 * | 6/2006 | Multhaup et al. | 714/28 |
| 2006/0212723 | A1 * | 9/2006 | Sheymov | 713/194 |
| 2007/0038867 | A1 | 2/2007 | Verbauwhede et al. | |
| 2007/0136455 | A1 * | 6/2007 | Lee et al. | 709/223 |
| 2008/0040710 | A1 | 2/2008 | Chiriac | |
| 2008/0167853 | A1 * | 7/2008 | Fernsler et al. | 703/14 |
| 2008/0263659 | A1 * | 10/2008 | Alme | 726/22 |
| 2008/0271147 | A1 * | 10/2008 | Mohanan et al. | 726/24 |
| 2009/0006074 | A1 * | 1/2009 | Green | 703/28 |
| 2009/0077544 | A1 * | 3/2009 | Wu | 717/160 |
| 2009/0126016 | A1 * | 5/2009 | Sobko et al. | 726/23 |
| 2009/0165138 | A1 * | 6/2009 | Stewart et al. | 726/24 |

* cited by examiner

*Primary Examiner*—David Garcia Cervetti
(74) *Attorney, Agent, or Firm*—Bardmesser Law Group

(57) ABSTRACT

A method and system for accelerating malware emulator by using an accelerator. The accelerator allows for a potentially malicious component (i.e., process) containing dummy processes to be executed in a real CPU of a computer system using its operating memory. A special memory area is allocated for the process based on the memory requested by the process in the emulator. The state of the CPU and the memory is loaded in the emulator prior to executing the suspicious process. The system can be restored to its initial state in case of malicious actions performed by the process. The dummy instructions of the process are processed by the CPU at its own speed and as soon as the process performs a malicious instruction it is stopped by the emulator. The emulation process is accelerated to a speed of a regular CPU.

19 Claims, 5 Drawing Sheets

METHOD FOR ACCELERATING HARDWARE EMULATOR USED FOR MALWARE DETECTION AND ANALYSIS

BACKGROUND OF THE INVENTION

1. Field of the Invention

The present invention is related to anti-malware technology, and more particularly, to a method and system for a hardware accelerator for malware emulation.

2. Description of the Related Art

Figure 1:
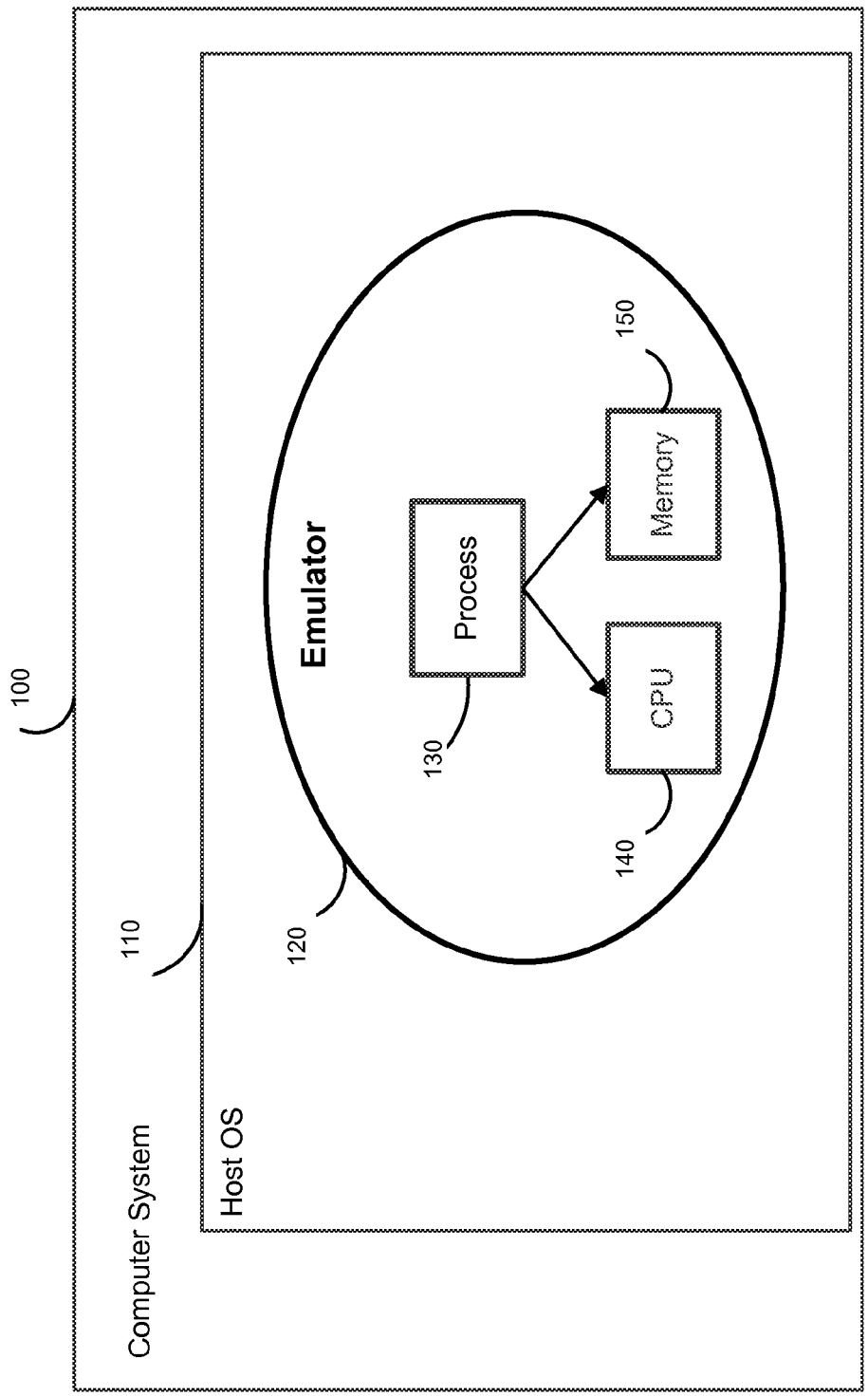

Over the past decade malware components and viruses have become more sophisticated. An ability to emulate an execution of a malware component on a computer system is critical in terms of providing security and maintaining integrity of a computer system data. Emulation is typically used for anti-virus and malware detection procedures. In order to analyze a behavior of malware components, such as viruses, and to collect statistics, a computer system is emulated and the viruses are run on the emulated computer system as shown in FIG. 1.

A computer system 100 has a host Operating System (OS) 110. The host OS 110 has an emulator 120 implemented within it. The emulator 120 is isolated from the host OS 110 and all processes launched within the emulator 120 do not have access to the host OS 110 file system. Thus, a potentially malicious process executed within the emulator 120 cannot cause any harm to the host OS 110 and the computer system 100.

The emulator 120 emulates an operating system (which may be the same as the host OS 110, or may be a different OS). It has an emulated CPU 140 and an emulated operating memory 150. When an executable component is emulated, a process 130 is launched within the emulator 120. The process 130 uses computation resources of the emulator 120 for execution of its instructions. Since the CPU 140 is emulated, the process executes much slower than if it were executed on the real CPU of the computer system 100. Modern viruses can often involve a large number of executed instructions, and, therefore, speed of execution of emulated code becomes important.

Furthermore, many malware components are programmed in such a way, that when executed on a computer system, they first run a large number of processes that are non-malicious by nature. The sole purpose of these processes is to tie down the emulator and use up its resources to the point where it cannot effectively emulate the malicious processes that follow.

These "useless" processes are often referred to as "dummy processes" or "dummy loops." The dummy loops can perform millions of senseless operations that slow down the emulation process from a several seconds up to several minutes, which is a significant amount of time in terms of malware detection. Also, some processes such as unpacking can also take a significant amount of time. Also, some processes inherently involve a large number of instructions. For example, the calculation of the value of pi to a large precision is calculation-intensive (and may be entirely irrelevant to the purpose of the program, but solely intended to load the CPU and therefore "trick" the emulator). The remainder of this description primarily mentions dummy loops, however, it is understood that the concepts described herein are applicable to other calculation-intensive processes, such as unpacking, decryption, etc. For effective malware detection, the emulation should take not much longer than a few seconds or even one or two seconds. Thus, the emulator will emulate only the dummy loops (or only some of them) and will finish its work, since no malicious actions are detected over this period of time.

Thus, the emulation of the malware component stops before it gets to the "real" malicious code. This presents a serious problem for malware detection, as some malware components will be undetected due to the dummy loops contained in them. Conventional emulators lack sufficient processing speed and need to work faster in order to detect malware containing dummy loops.

Accordingly, a system and method for accelerating the malware emulators is desired.

SUMMARY OF THE INVENTION

The present invention provides a method and system for accelerating malware emulators that substantially obviates one or several of the disadvantages of the related art.

In one aspect there is provided a system and method for accelerating malware emulators using a hardware accelerator. The accelerator allows for a potentially malicious component (i.e., process) containing dummy processes to be executed in a real CPU of a computer system using a computer's operating memory. A special memory area is allocated for the process based on the memory requested by the process in an emulator. The state of the CPU and the memory is loaded into the emulator prior to executing the suspicious process. Thus, the system can be restored to its initial state in case of malicious activities performed by the process.

If, during the execution of the process, the process attempts to access some other memory areas outside the allocated area, the process is terminated on the CPU and continued execution of the process then occurs in the emulator. Therefore, the dummy instructions of the process are processed by the CPU at its own speed and as soon as the process goes outside its allocated memory area, it is stopped by the emulator. Thus, the emulation process is accelerated to a regular speed of a CPU.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

Figure 2:
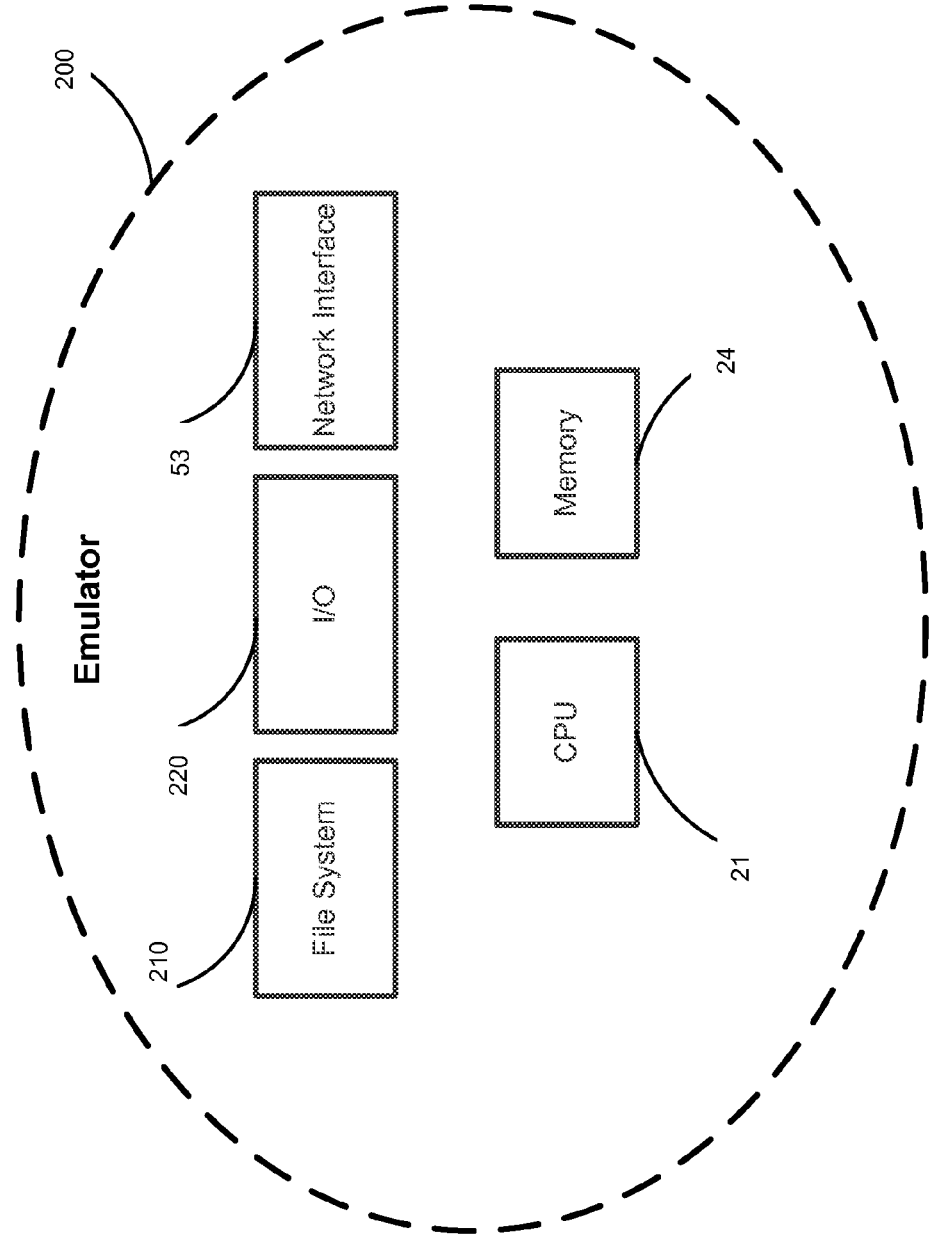
Figure 3:
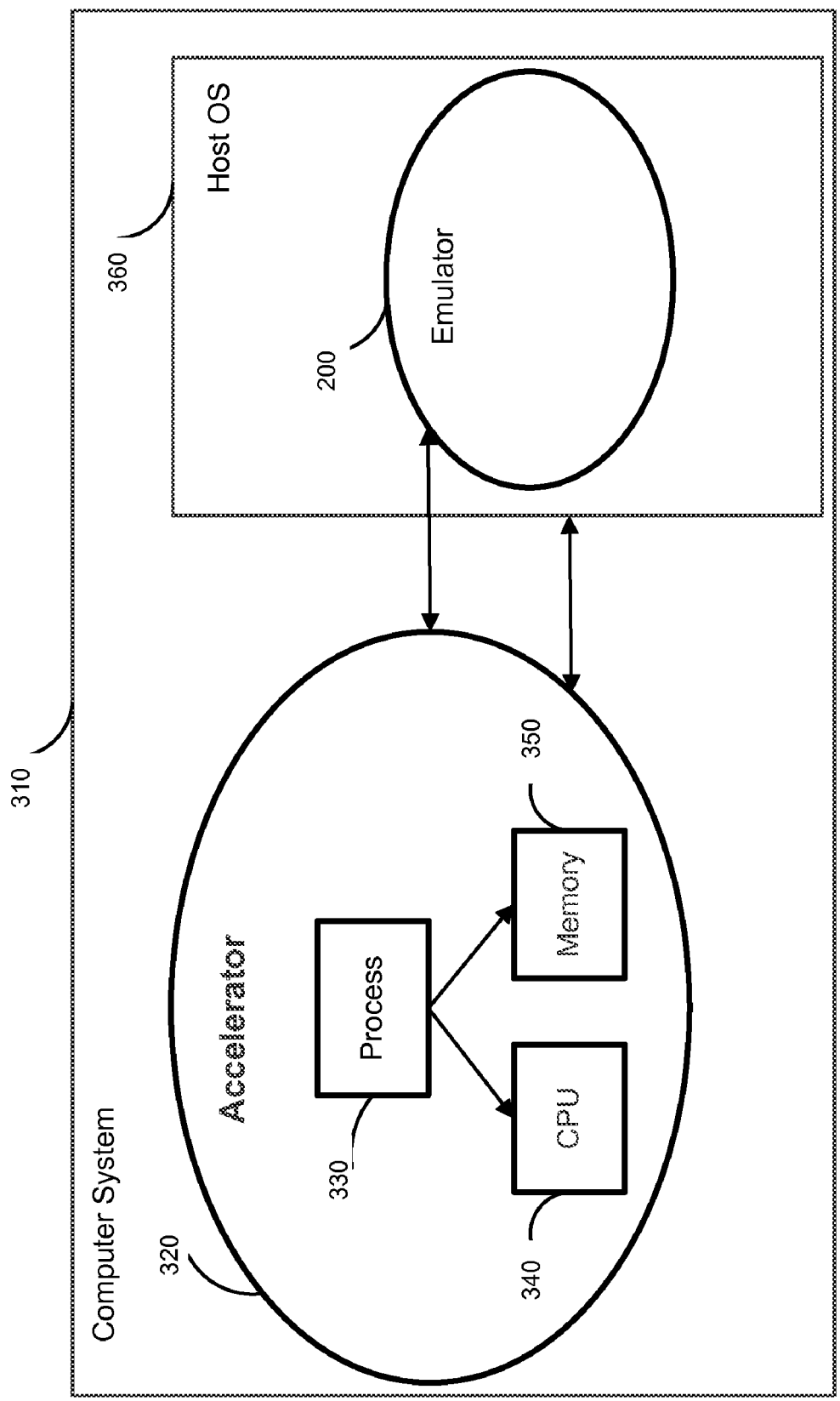
Figure 4:
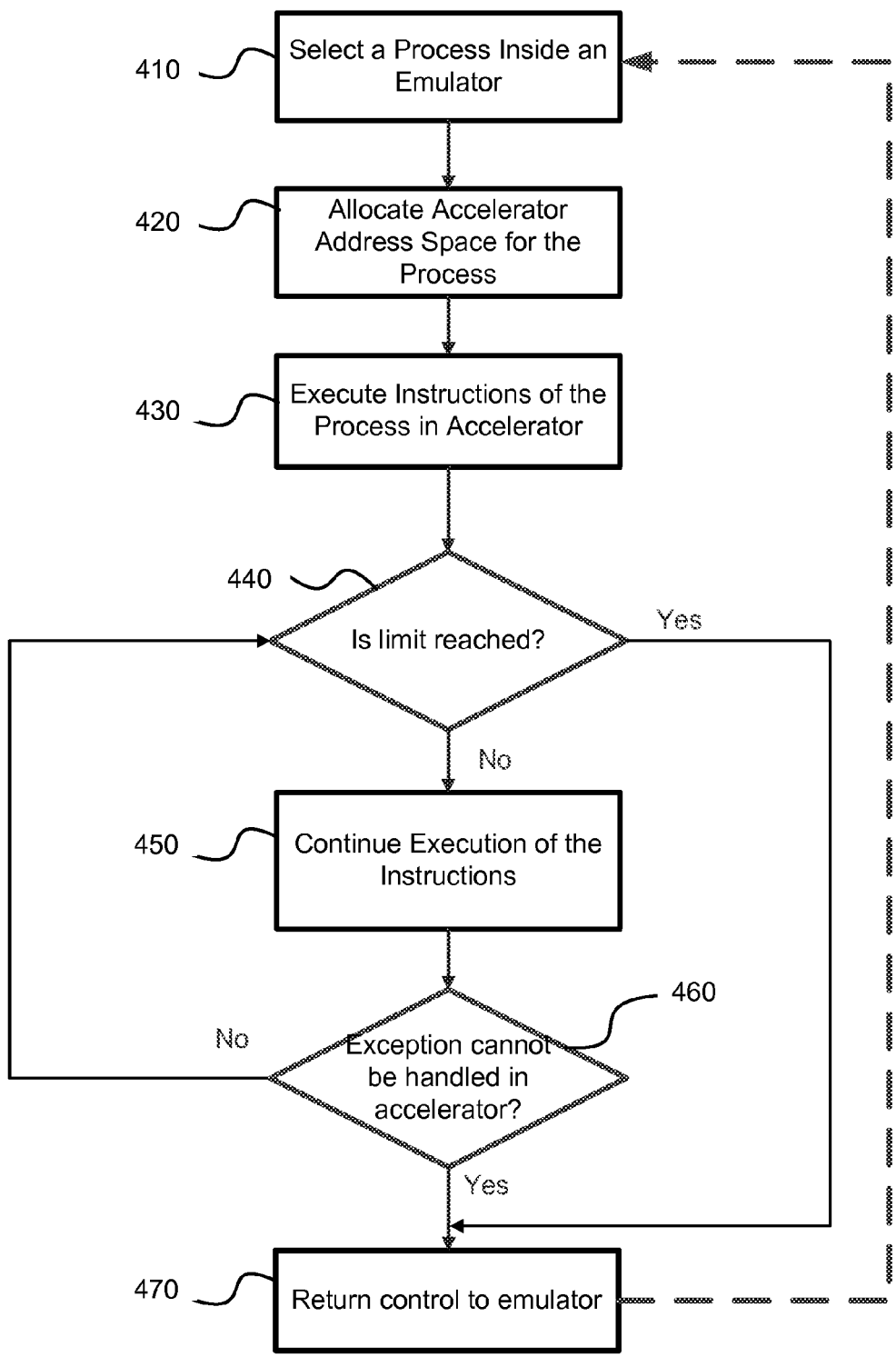
Figure 5:
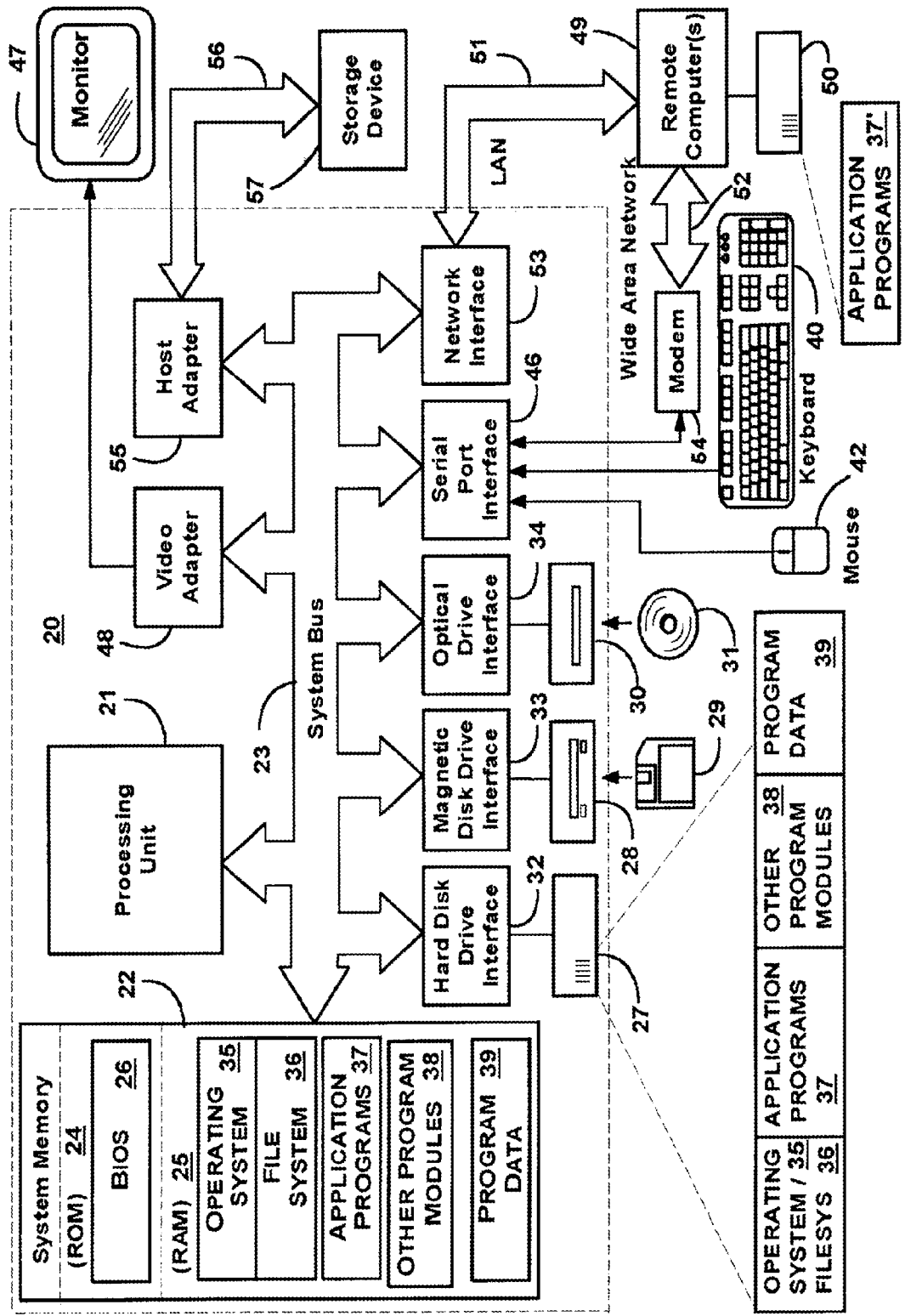

In the drawings:

FIG. 1 illustrates a block diagram of a conventional emulator implemented on a computer system;

FIG. 2 a block diagram of an emulator of a computer system, in accordance with an exemplary embodiment;

FIG. 3 illustrates a block diagram of an accelerator in accordance with the exemplary embodiment; and FIG. 4 illustrates an acceleration method in accordance with the exemplary embodiment; and FIG. 5 illustrates a schematic of an exemplary computer system on which the exemplary embodiment can be implemented.

DETAILED DESCRIPTION OF THE PREFERRED EMBODIMENTS

Reference will now be made in detail to the preferred embodiments of the present invention, examples of which are illustrated in the accompanying drawings.

The present invention provides a method and system for accelerating malware emulators. In one aspect there is provided a system and method for implementing a hardware accelerator for a malware emulator.

The accelerator allows for a potentially malicious component (i.e., process) containing dummy processes to be executed on a real CPU of a computer system using its random access memory. A special isolated memory area (i.e., an accelerator space) is allocated for the process based on the memory requested by the process in the emulator. The state of the computer system CPU and the memory is loaded in the emulator prior to executing the suspicious process in the allocated memory. The allocated memory area is monitored by the emulator and the accelerator is started and terminated by the emulator. Once the emulation is over, the allocated memory area can be released.

If, during its execution, the process attempts to access some other memory areas, outside the isolated allocated area, the process is terminated on the CPU and returns execution in the emulator, and is then emulated inside the emulator for further analysis. Therefore, the dummy instructions of the suspicious process are advantageously processed by the CPU of the computer system at a higher speed.

The allocated isolated memory area (address space) can be set up by reloading the processor control registers (e.g., CR0, CR1, CR0, the tables IDT, LDT, etc. in the INTEL architecture, or similar in other architectures), or by using hardware virtualization instructions (VT-X instruction set in the INTEL architecture, similar concepts in AMD and other architectures).

Alternatively, a process can be terminated and moved to the emulator for further analysis, when the process requires more and more memory as it executes. Generally, if the process contains millions of dummy instructions, the emulator can maintain a counter of executed instructions, and can be used by the emulator as a sign that the process is potentially problematic, and native execution of the process should be terminated on the CPU and native execution should continue in the emulator. Thus, the process is terminated in the accelerator and is moved back to the emulator. If the process is completed in the accelerator, it can also be moved to the emulator for further analysis. Note that the native execution of the process in this context means that the instructions of the process are not modified when the execution is continued in the emulator. In other words, there are no binary translations of any kind being performed in the emulator of the exemplary embodiment.

Otherwise, as soon as the process performs an instruction that raises an exception (such as, for example, attempts to access memory outside of the allocated area, executing instructions past a pre-defined count), it is stopped by the emulator. Thus, the emulation process is advantageously accelerated to a speed of a regular CPU, since all of the time consuming dummy processes are processes on the CPU. According to the exemplary embodiment, the emulator controls the accelerator and processes the system exceptions and interrupts. The exception (or at least some exceptions) can also be processed by the accelerator. The exceptions, which, when raised, force the control back to the emulator, are those that the accelerator itself cannot process.

For example, the accelerator can process the RDTSC instruction, invoking the co-processor, and additional loading of a current paging (typically, exceptions that are frequently raised and are relatively "easy" to handle). Other exceptions that force control back to the emulator can be division by zero (or similar operations that malware code often uses to trigger an exception so that it can then intercept it and process it itself), attempting to address a zero address, debug breakpoint, failure to load required page (page fault), general protection fault, attempt to execute a privileged instruction, attempt to modify flags that can only be modified in privileged mode, or modify some system registers (e.g., CR0, DR0-DR7).

Malware code is frequently packed into an archive (like a zip archive or similar), or encrypted (to prevent an analyst from looking at the code and visually determining that the code is malicious). The emulator can rapidly go through the unpacking and decryption process, prior to execution of the code, or can give the unpacked/unencrypted code to the analyst directly, if possible.

The emulator acceleration scheme is implemented as a special driver installed on a computer system. The memory area affected by the process can be also loaded into the emulator for analyzing the actions performed or attempted by the process. For example, code or data in the memory can be analyzed for virus signatures, or various heuristics can be used to detect virus presence.

According to the exemplary embodiment, the process in the isolated memory area (i.e., an accelerator space) is run in a user mode. If it attempts to access the kernel mode, it will raise an exception, the process is terminated, and sent to the emulator for further analysis. Also, the emulator can execute instructions in user mode when those instructions are originally intended to execute in kernel mode. (For example, drivers can be executed in the emulator in the user mode, even though normally such drivers run in kernel mode).

An exemplary emulator that requires acceleration is illustrated in FIG. 2. The emulator 200 emulates an entire computer system. Thus, a CPU 21 and a random access memory 24 are emulated. The emulator 200 also emulates a file system 210, I/O devices 220 (also shown as 28, 30, 40 and 42 in FIG. 5), and a network interface 53. The emulator 200 can also emulate other devices of a computer system. As discussed above, when a malware-related process runs on the emulated computer system, it takes longer. Therefore, the emulator 200 needs to be accelerated for effective malware detection.

An accelerator, in accordance with the exemplary embodiment, is illustrated in FIG. 3. The emulator 200 is implemented on a host OS 360 of a computer system 310. For implementation of an accelerator, an isolated address space 320 for a potential malware process 330 is allocated on a computer system 310. The state of registers and memory in the accelerator space 320 is kept the same as in the emulator 200. Then, the context of the process 330 is provided into the address space 320 by the emulator 200.

The accelerator address space 320 is also isolated from the OS host 360 where the emulator 200 resides. Thus, when the process 330 executes in the accelerator address space 320, it is isolated from the emulator 200. Then, the process 330 uses only the resource of a real CPU 340 and a real memory 350 of the computer system 310. The process 330 is executed on the processor 340 until an exception is raised or an instruction limit is reached. Then, the process is terminated on the CPU and the emulator 200 takes control.

Some exceptions are processed by the accelerator, such as some processor exceptions, an abnormal resource utilization (i.e., excessive memory usage, etc.), an execution of RDTSC instruction (Read TimeStamp Counter), a launch of a coprocessor, additional loading of the current memory page, etc. Other exceptions cause termination of the acceleration, and control returns to the emulator. The system interrupts are passed on to the host OS 360 as soon as they occur. Note that not all of the instructions are executed on the processor 340. Some of the instructions, such as, for example, the privileged instructions or instructions that are privileged as far as the accelerator is concerned (e.g., RDTSC and SSE—Streaming SIMD Extensions) are executed in the emulator 200 and are not provided to the accelerator 320.

FIG. 4 illustrates a method for emulator acceleration, in accordance with the exemplary embodiment. The suspected process requiring emulation is selected at step 410. An address space needed for this process is allocated in an accelerator at step 420. The process instructions are executed in the accelerator at step 430. Then, at step 440, it is determined whether the limit on the number of instructions to be executed has been reached, or a time allocated for the accelerator has been exceeded. The limits are generally pre-set in the emulator code, such as, e.g., 15 million instructions to be executed, or 150 million processor cycles maximum to be executed in the accelerator, or reaching a particular pre-determined timestamp counter, etc., and generally relates to a quantum of time used by the OS.

If the memory is not sufficient, the process is stopped in the accelerator and the emulation results are recorded at step 470. If, at step 440, it is determined that the limit on the number of instructions to be executed has not been reached, the execution of the instructions is continued at step 450. Then, if at step 460, the particular exception cannot be handled "natively" (inside the accelerator), the process is terminated and control returns to the emulator at step 470. Note that the same process can be run through the emulator several times, while there are no binary code translations of any kind being performed in the emulator of the exemplary embodiment. Thus, code instructions remain native (i.e., unmodified).

Also, the accelerator can be run several times, whether using the same starting point in the code, or different starting points, after recording the results of the previous run.

The emulator sets up the accelerator, including memory pages that the accelerator can use, interrupt descriptor table, GDT, etc. The accelerator, once given control, places the process into a particular thread and gives it the memory and maps the pages from the emulator to the process.

Those skilled in the art will appreciate that the preferred embodiment provides for an efficient method of accelerating malware emulators. The proposed system and method allows effective detection of malware components containing large volumes of dummy loops in them.

With reference to FIG. 5, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for acceleration of malware emulators, which allows efficient detection of malware components containing large volumes of dummy instructions.

It should also be appreciated that various modifications, adaptations and alternative embodiments thereof may be made within the scope and spirit of the present invention. The invention is further defined by the following claims.

What is claimed is:

1. A computer-implemented method for accelerating a malware emulator, the method comprising:
   (a) selecting a process inside an emulator;
   (b) allocating an isolated accelerator address space for the process on a computer system;
   (c) executing, in the user mode, native unmodified instructions of the process in the accelerator address space, wherein:
      the process is stopped in the accelerator when any one of the following events occur:
         (i) a specified exception is raised;
         (ii) a limit on instructions to be executed is reached; and
         (iii) a pre-determined time for the accelerator is reached; and
      the execution of the process is continued inside the emulator;
   (d) recording the process execution results; and
   (e) providing the process execution results from the accelerator to the emulator.

2. The method of claim 1, wherein the process is stopped in the accelerator upon occurrence of any of:
   a processor exception;
   a processor interrupt;
   an abnormal resource utilization;
   an activation of a co-processor;
   an execution of an RDTSC instruction; and
   an additional loading of a current page.

3. The method of claim 1, further comprising loading a state of a CPU and a memory into the emulator, prior to resumption of the execution of the process in the emulator.

4. The method of claim 1, wherein the process comprises dummy loops.

5. The method of claim 4, wherein the process is emulated in the emulator after the dummy loops have been processed in the accelerator address space.

6. The method of claim 1, wherein the process comprises encryption or decryption.

7. The method of claim 1, wherein the process comprises packing or unpacking a file.

8. The method of claim 1, further comprising emulating the process inside the emulator for further analysis after the process is stopped in the accelerator.

9. The method of claim 8, wherein the emulated process is compared against signatures of known malware components.

10. The method of claim 1, wherein the recording of the process execution results is performed up to a point of stopping of the process in the accelerator.

11. The method of claim 1, wherein privileged processor instructions issued by the process are executed on the emulator after stopping the process in the accelerator.

12. The method of claim 1, wherein the selected process has user mode privilege level.

13. The method of claim 1, wherein the selected process has kernel mode privilege level.

14. A system for accelerating a malware emulator, the system comprising:
   a computer system having a memory and a CPU;
   an operating system (OS) running on the computer system;
   an emulator implemented on the OS for emulating a process;
   an accelerator implemented on the computer system, wherein:
      the accelerator is isolated inside an allocated memory space controlled by the emulator;
      the emulator initiates execution of the process in the accelerator for native execution on the CPU; and
   the accelerator executes, in the user mode, native unmodified instructions of the process in the accelerator address space, such that the process is stopped in the accelerator when any one of the following events occur:
      a specified exception is raised;
      a limit on instructions to be executed is reached; and
      a pre-determined time for the accelerator is reached; and
   the execution of the process is continued inside the emulator, with the emulator recording the process execution results.

15. The system of claim 14, wherein the emulator stops the process in the accelerator upon occurrence of any of:
   a processor exception;
   a processor interrupt;
   an abnormal resource utilization;
   an activation of a co-processor;
   an execution of an RDTSC instruction; and
   an additional loading of a current page.

16. The system of claim 14, wherein the emulator loads a state of a CPU and a memory, prior to resumption of the execution of the process in the emulator.

17. The system of claim 14, wherein the process comprises dummy loops.

18. The method of claim 17, wherein the process is emulated in the emulator after the dummy loops have been processed in the accelerator address space.

19. The system of claim 14, wherein the emulator records process execution results up to a point of stopping of the process in the accelerator.

* * * * *

UNITED STATES PATENT AND TRADEMARK OFFICE
CERTIFICATE OF CORRECTION

PATENT NO.         : 7,603,713 B1                                                      Page 1 of 1
APPLICATION NO.    : 12/413907
DATED              : October 13, 2009
INVENTOR(S)        : Sergey Y. Belov It is certified that error appears in the above-identified patent and that said Letters Patent is hereby corrected as shown below:

Title page 1, Item (75) delete the inventor's name "Sergeh Y. Belov" and replace with
--Sergey Y. Belov--.

Signed and Sealed this

Second Day of February, 2010

David J. Kappos
*Director of the United States Patent and Trademark Office*